United States Patent
Barrina

(10) Patent No.: US 10,222,631 B2
(45) Date of Patent: Mar. 5, 2019

(54) RETAINING DEVICE FOR READING GLASSES AND FOLDABLE READING GLASSES

(71) Applicant: Chain Readers Inc., Mississauga (CA)

(72) Inventor: Amanda Barrina, Treasure Island, FL (US)

(73) Assignee: Chain Readers Inc. (CA)

( * ) Notice: Subject to any disclaimer, the term of this patent is extended or adjusted under 35 U.S.C. 154(b) by 0 days.

(21) Appl. No.: 15/756,773

(22) PCT Filed: Sep. 30, 2016

(86) PCT No.: PCT/IB2016/001509
§ 371 (c)(1),
(2) Date: Mar. 1, 2018

(87) PCT Pub. No.: WO2017/055923
PCT Pub. Date: Apr. 6, 2017

(65) Prior Publication Data
US 2018/0267329 A1    Sep. 20, 2018

Related U.S. Application Data

(60) Provisional application No. 62/284,485, filed on Oct. 1, 2015.

(51) Int. Cl.
| G02C 5/00 | (2006.01) |
| G02C 5/08 | (2006.01) |
| G02C 3/00 | (2006.01) |
| G02C 5/14 | (2006.01) |

(52) U.S. Cl.
CPC ............... *G02C 5/08* (2013.01); *G02C 3/006* (2013.01); *G02C 5/006* (2013.01); *G02C 5/143* (2013.01)

(58) Field of Classification Search
CPC . G02C 5/00; G02C 5/08; G02C 5/006; G02C 5/20; G02C 5/143; G02C 3/006; G02C 3/003; G02C 11/02; G02C 11/10; G02C 2200/02; G02C 2200/08; G02C 5/008; G02C 5/02; G02C 5/12; G02C 5/14; A61F 9/027; G02B 2027/0176; G02B 2027/0178
USPC .......................................................... 351/63
See application file for complete search history.

(56) References Cited

U.S. PATENT DOCUMENTS

| 2,704,961 A | 3/1955 | Weil |
| 4,479,703 A | 10/1984 | Enghofer |
| 5,532,766 A | 7/1996 | Mateer et al. |
| 5,557,345 A | 9/1996 | Katzenmeyer et al. |
| D377,037 S | 12/1996 | Stolt |

(Continued)

*Primary Examiner* — Collin X Beatty
(74) *Attorney, Agent, or Firm* — Christopher Paradies; Paradies Law P.A.

(57) ABSTRACT

A retaining device for reading glasses comprises a lanyard and counterweights slidable engaging the lanyard. The counterweights are movable by sliding such that the counterweights hang in behind a user's ears to retain glasses on the user, when foldable temple pieces do not include ear pieces, such that the temple pieces do no rest on a user's ears. Instead, the lanyard extends over the user's ears and the counterweights apply a force, due to gravity, that acts opposite to the force of gravity on the glasses, retaining the glasses on the user's nose. For example, the glasses may be foldable into a pendant and may be retained on the user's neck until needed.

15 Claims, 6 Drawing Sheets

(56) References Cited

U.S. PATENT DOCUMENTS

| | | | |
|---|---|---|---|
| 6,048,061 A | 4/2000 | Chiu | |
| 6,142,623 A * | 11/2000 | Jones | G02C 3/003 |
| | | | 351/155 |
| 6,158,860 A | 12/2000 | Huang | |
| 6,425,664 B1 | 7/2002 | Liu et al. | |
| D519,542 S | 4/2006 | Goodman | |
| 7,341,342 B2 | 3/2008 | Jain | |
| 7,427,133 B2 | 9/2008 | Carter | |
| 7,832,855 B2 | 11/2010 | Stovall | |
| D630,241 S | 1/2011 | Campbell | |
| 7,905,591 B2 | 3/2011 | Strobel | |
| 8,317,317 B2 | 11/2012 | Pulvino et al. | |
| D750,155 S | 2/2016 | Ganovsky et al. | |
| 9,354,454 B1 | 5/2016 | Tharp | |
| D759,149 S | 6/2016 | Brown | |
| 2006/0055869 A1 | 3/2006 | Dietz | |
| 2007/0046889 A1 | 3/2007 | Miller et al. | |
| 2007/0064196 A1 | 3/2007 | Avery | |
| 2007/0132938 A1 | 6/2007 | Huang | |
| 2009/0185131 A1 | 7/2009 | Esbensen | |
| 2010/0283960 A1 | 11/2010 | Berdou | |
| 2011/0037939 A1 | 2/2011 | Pulvino et al. | |

* cited by examiner

RETAINING DEVICE FOR READING GLASSES AND FOLDABLE READING GLASSES

CROSS RELATED APPLICATIONS

This application is a 371 U.S. national phase of International Application PCT/IB2016/001509 filed Sep. 30, 2016 which claims priority to U.S. provisional application No. 62/284,485, entitled A Foldable/Collapsible Eyeglass Pendant on Weighted Chain with Magnetic Closures, which was filed Oct. 1, 2015, and the disclosure and drawings of which are hereby incorporated by reference in their entirety.

FIELD OF THE INVENTION

The field relates to glasses, especially reading glasses, and accessories for reading glasses.

BACKGROUND

U.S. Pat. No. D759,149 discloses an ornamental design of glasses that are strapped on and include a decorative lanyard, but it fails to disclose adjustable weights or foldable temple portions attached to a lanyard. U.S. Pat. No. 2,704,961 discloses a lanyard attachable to the ear pieces of known glasses, showing a mechanism for attaching the lanyard onto the ends of the ear pieces. U.S. Pat. No. 4,479,703 discloses a lanyard attachable to ear pieces and includes a fastener for fastening and unfastening the lanyard. U.S. Pat. No. 5,557,345, U.S. Pat. No. 7,341,342 and D377,037 disclose glasses or sunglasses having a pair of chains, each one attached at each side of the frame of the glasses. A decorative medallion or crystal is attached at the end of each chain and drapes over a respective ear, but the position of the medallion or crystal is not adjustable, the glasses do not have temple portions, and the chains are not configurable as a lanyard. U.S. Pat. Nos. 6,048,061 and 8,317,317 disclose foldable reading glasses and a magnetic coupling of a lanyard on opposite ends of the eyeglass frames but fail to disclose foldable temple portions, adjustable weights, or any way of protecting the lenses when the eyeglasses are folded. U.S. Pat. No. 6,158,860 discloses another way of folding reading glasses; however, this issued patent discloses slidably adjustable ear pieces and not a lanyard or adjustable weights. Also, the lenses are not protected, and the issued patent discloses using a case for protecting the lenses of the eyeglasses. U.S. Pat. No. 7,427,133 discloses a strap attachable on opposite sides of eyeglass frames, but this patent fails to disclose any foldable temple portions, adjustable weights or any way of protecting the lenses. U.S. Pat. No. 7,905,591 discloses foldable reading glasses with fold out ear pieces, but does not disclose a lanyard or adjustable weights or magnets. Instead, springs and detents allow the glasses to be folded. U.S. Pat. No. 9,354,454 discloses how to attach a lanyard onto known, non-foldable eyeglasses and sunglasses. U.S. Pat. Publ. 2006/0055869 discloses a magnetic attachment for a lanyard disposable onto ear pieces of non-foldable eyeglasses and sunglasses. U.S. Pat. Publ. 2007/0046889 discloses an adjustable counterweight for non-foldable eyeglasses, but the counterweight is for balancing the relative mass on the left side of the eyeglass frame and the right side of the eyeglass frame, but this application fails to disclose foldable eyeglasses, temple pieces or protection for the eyeglass lenses. U.S. Pat. Publ. 2007/0132938 discloses foldable reading glasses that use magnetic attraction to keep the glasses unfolded for wear, but these glasses have ear pieces that fold out. This publication fails to disclose any lanyard, adjustable weights, temple pieces without ear pieces and protection for the lenses of the glasses.

U.S. Pat. Publ. 2009/0185131 discloses a completely different way of solving the problem with rigid eyeglasses and a rigid tether to retain the eyeglasses on the wearer. A magnetic catch may be used to hold the glasses together at the nose piece or the ends of the solder tether. U.S. Pat. Publ. 2010/0283960 discloses another type of strap/lanyard that attaches to the eyeglass frame and doubles back on itself with a magnetic retainer on the strap/lanyard. However the glasses are not foldable, the lenses are not protected and there are no adjustable weights. U.S. Pat. Nos. D519,542 and D630,241 disclose ways of attaching an eyeglass strap to the ear pieces of glasses.

While there are many ways to make reading glasses more convenient and accessible, none of the foregoing combines the features of a retaining device for reading glasses and foldable reading glasses.

SUMMARY

A pair of foldable reading glasses may comprise a pair of lenses for magnification and/or correcting the vision of a person wearing the glass and a lanyard attached at opposite sides of the glasses. When folded, the lenses are protected by the temple portions of a frame of the glasses, at least partially. The temple portions do not extend the full distance to a wearer's ears, as do the temples portions of ordinary reading glasses. Instead, the reading glasses, when folded, hangs from the neck of the wearer as a decorative pendant. When unfolded and worn as glasses, the lanyard connected to opposite sides of the temple portions is disposed above the ears, such that a portion of the lanyard extends over the ears and hangs down across the back of the neck. The glasses further comprise a plurality of weights slidably engaged on the lanyard, such that the wearer may adjust the position of the weights on the lanyard. The weights may be adjusted to add mass to the portion of the lanyard hanging down from the ears, providing a counterweight that retains the glasses on the nose of a wearer, preventing the glasses from sliding down the nose of the wearer, without using any ear pieces.

The mass of the weights may be selected to provide sufficient mass, in combination with the mass of the lanyard to more than offset the mass of the lenses and the frames of the glasses. Therefore, a slight tension may be applied to the lanyard disposed between the temple portions of the frame and ears of the wearer.

In one example, the weights are retained in position on the lanyard by a material that results in a substantial static friction coefficient, such that the weights do not move on the lanyard unless acted upon by the wearer sliding the weights on the lanyard. In other words, a static friction coefficient between two materials is selected such that the weights do not slide on the lanyard under their own mass, but only when a wearer applies a force that exceeds the force necessary to overcome the static friction. For example, a type of rubber, such as silicone rubber, may be provided on the inner surface of a retention bead or a weight that contacts the lanyard. In one example, the lanyard is a chain, such as a metal chain, having a metal surface in contact with an inner surface of a bore hole through the bead or weight. The metal surface may be a stainless steel, a precious metal or the like. Alternatively, the lanyard may be a rope or cable, rather than a chain.

A "lanyard" is defined herein as a cordlike structural element having a tensile strength but little or no stiffness, such as a rope, cable or chain, for example, such that the lanyard is capable of draping over the ear of a wearer. A "frame" is the solid structure retaining the lens in the glasses, and the "frames" retain the two lenses and may be joined by a hinge, one to the other, for example. In this application, the term frame and frames does not include foldable temple pieces or foldable ear pieces, which may be attached to the frames of the glasses.

In one example, foldable reading glasses for use by a wearer comprise a lanyard; a plurality of weights adjustably mounted on the lanyard, whereby the wearer adjusts the position of the plurality of weights on the lanyard; a first frame having a front surface and a rear surface; a second frame, having a front surface and a rear surface, the second frame being hingedly coupled to the first frame, such that the first frame and the second frame are hingedly engaged such that the front surface of the first frame may be disposed in opposition to the front surface of the second frame, when the first frame and the second frame are hingedly disposed in the closed configuration; a first temple piece is hingedly coupled to the first frame at one end of the first temple piece and is coupled to the lanyard at an opposite end of the first temple piece, opposite of the one end of the first temple piece, such that the first temple piece at least partially covers the first frame, when disposed in the closed configuration; and a second temple piece is hingedly coupled to the second frame at one end of the second temple piece and is coupled to the lanyard at an opposite end of the second temple piece, opposite of the one end of the second temple piece, such that the second temple piece at least partially covers the second frame, when disposed in the closed configuration; wherein the plurality of weights have a collective mass selected to counterbalance the weight of the foldable reading glasses, when the foldable reading glasses are disposed in the open configuration on a bridge of a nose of the wearer, and the lanyard is disposed over each of the wearer's ears and behind the wearer's neck.

For example, the glasses may further comprise a first magnetic material and a second magnetic material, wherein the first magnetic material is disposed in a portion of the first frame and the second magnetic material is disposed in a portion of the first temple piece, such that the first magnetic material is magnetically attracted and opposed to the second magnetic material, when the first frame and the first temple piece are disposed in the closed configuration. For example, a third magnetic material and a fourth magnetic material may be present, wherein the third magnetic material is disposed in a portion of the second frame and the fourth magnetic material is disposed in a portion of the second temple piece, such that the third magnetic material is magnetically attracted and opposed to the fourth magnetic material, when the second frame and the second temple piece are disposed in the closed configuration. A fifth magnetic material and a sixth magnetic material may be present, wherein the fifth magnetic material is disposed in a portion of the first frame, and the sixth magnetic material is disposed in a portion of the second frame, such that the fifth magnetic material is magnetically attracted and opposed to the sixth magnetic material, when the first frame and the second frame are disposed in the closed configuration. In one example, the plurality of weights comprises a channel, each of the channels passes through a respective one of the plurality of weights, and the lanyard is threaded through the channels of each of the plurality of weights. Thus, the channel is a through hole, passing entirely through the weights. Alternatively, the channels may be open channels or openable, and the weights may be crimped onto the lanyard or closed onto the lanyard by a mechanical device or the like. Preferably, if the lanyard is smooth, such as a lanyard made of a metal material, the at least one of the plurality of weights comprises an inner surface of the channel, and the inner surface is comprised of a friction material, such as a silicone. For example, the silicone is adhered to the surface of the channel passing through the weight or weights. The chain may be comprised of a metal, such as a stainless steel or a precious metal. The weight may be made of the same material or a different material, if a different material, then galvanic corrosion must be considered. One advantage of a friction material between the weight and the lanyard is that the friction material may be an insulator, preventing galvanic corrosion. In one example, both the weight and the chain are of a stainless steel, gold, silver or platinum. In one example, the plurality of weights are at least ten times more massive than the mass of the lanyard. For example, the lanyard may be comprised of a chain, and the chain may be a box chain, a wheat chain or a snake chain, for example. If the inner surface of the weight is a silicone, a box chain is preferable, as a box chain allows the weights to be positioned anywhere along the chain without damaging the silicone layer or insert.

In one example, the glasses further comprise at least two weights and at least four stoppers. One of the stoppers is disposed on each side of the two weights in this example, and the stoppers have a friction material, such as a silicone, on the stoppers' inner surfaces. Thus, the weights may be adjustably positioned along the length of the lanyard.

BRIEF DESCRIPTION OF THE DRAWINGS

The following drawings are illustrative examples and do not further limit any claims that may eventually issue.

FIGS. 2-2A illustrate (2) a top view of an unfolded configuration ready for wear and (2A) a partial cross sectional view of an example of stoppers.

When the same reference characters are used, these labels refer to similar parts in the examples illustrated in the drawings.

DETAILED DESCRIPTION

Figure 1:
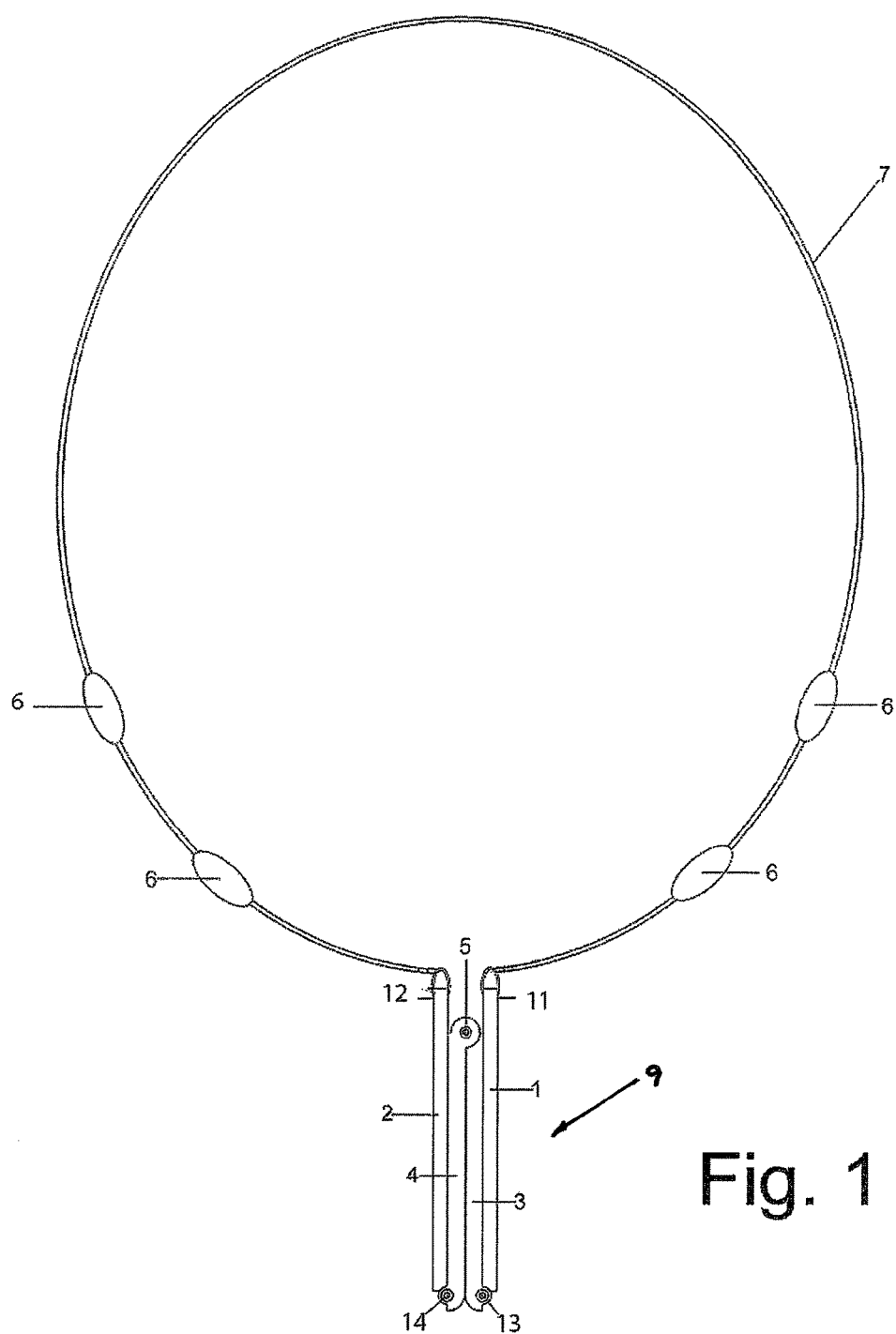
FIG. 1 illustrates a top view of foldable glasses without ear pieces and with a lanyard having counterweights in a folded configuration.
Figure 2:
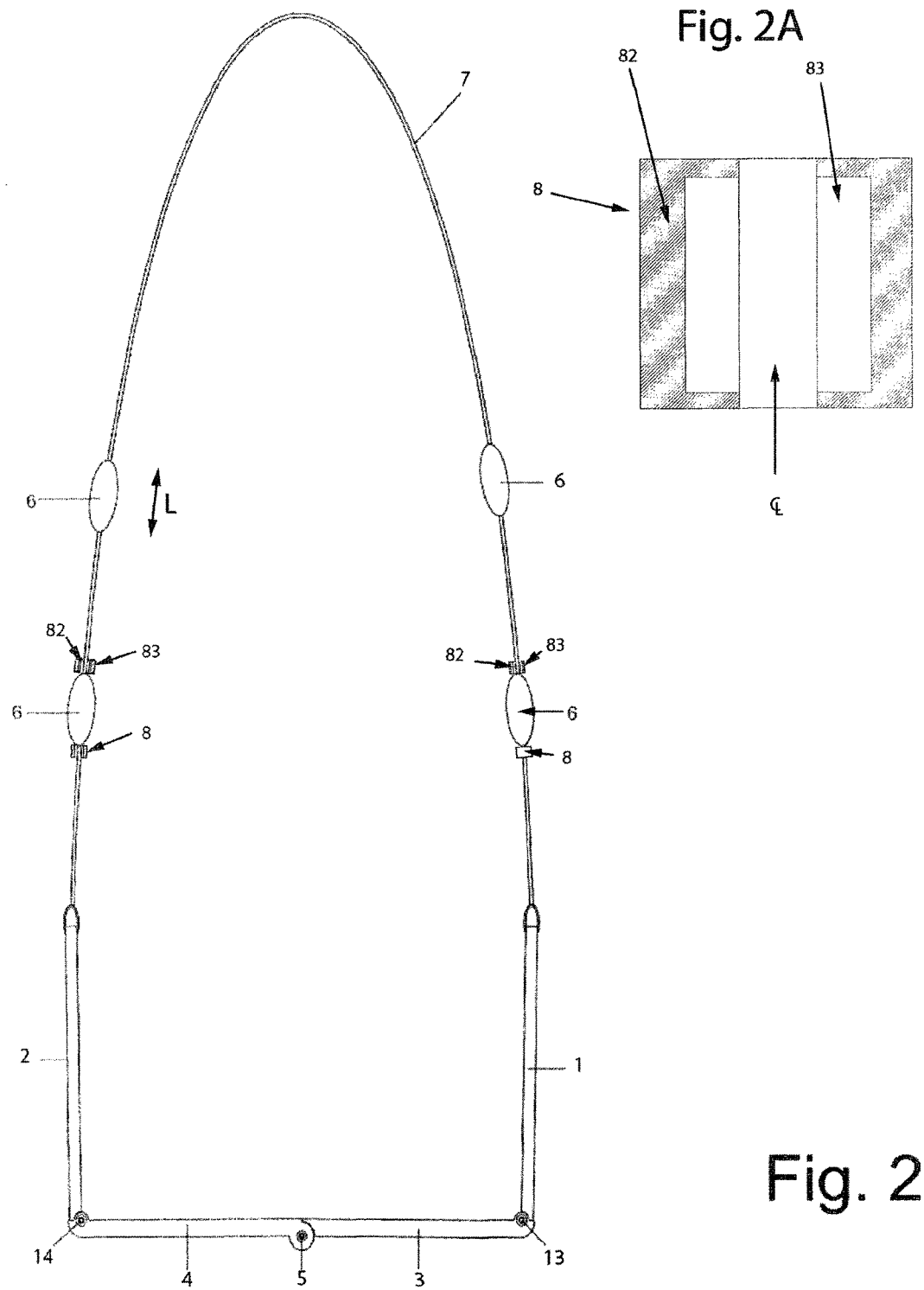

FIG. 1 illustrates a retaining device for foldable reading glasses 9. For example, the retaining device comprises a lanyard 7 and weights 6 and may be attached at attachment points 11, 12, such as holes extending through the ends of temple portions 1, 2. The temple portions 1,2 may be attached to foldable frames 3,4 by hinges 13,14. For example, the frames 3,4 may be pivotally attached, one to the other, by a hinge 5. In this example, the hinges 5,13,14 allow the glasses to be folded, such that the lenses are protected by the temple portions 1,2. As shown in FIG. 2, the glasses 9 may be unfolded, and the position of the weights 6 on the lanyard 7 may be positionally adjusted in a direction L along the lanyard 7. FIG. 2 shows a partial cross sectional view of a plurality of stoppers 8, which have a metal shell 83 and an inner surface formed of a friction material 82, such as silicone, for example. The stoppers 8 prevent movement of the weights 6, unless the stoppers 8 are repositioned by the wearer. The Friction material 82 prevents the stoppers from sliding during normal use, until the stoppers are intentionally repositioned.

Figure 3:
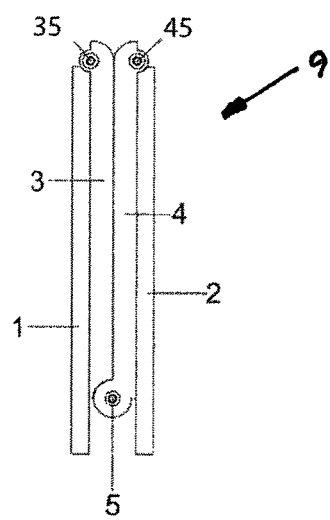
FIG. 3 illustrates a detailed top view of folded glasses.
Figure 4:
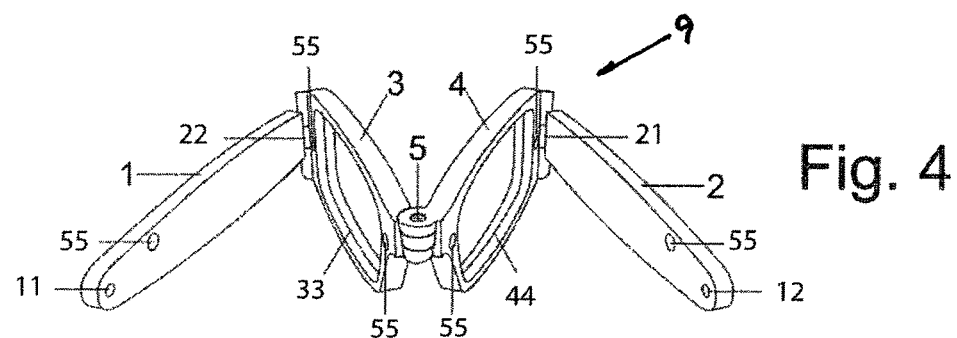
FIGS. 4-5 illustrate a detailed perspective view, partially unfolded.
Figure 5:
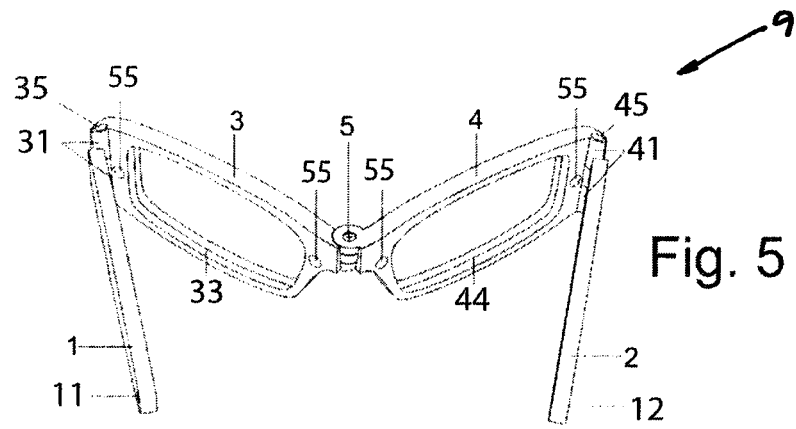
Figure 6:
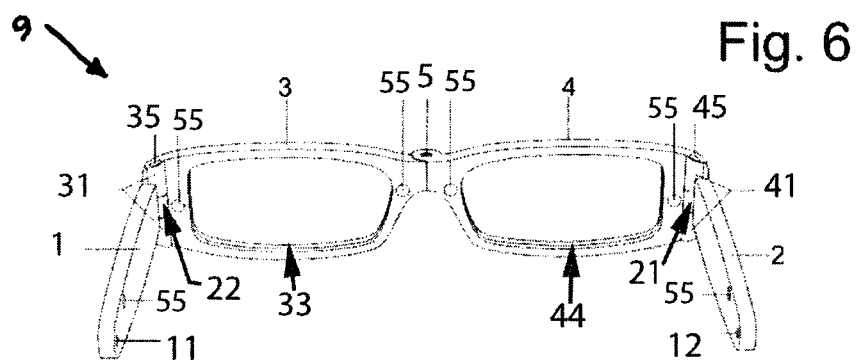
FIG. 6 illustrates a detailed perspective view of completely unfolded glasses.

FIGS. 3-10 illustrate detailed views of examples of the foldable glasses 9 in various configurations from closed (FIG. 3, 8-10) to fully open and ready for wear (FIG. 6). FIG. 3 shows the glasses 9 without the lanyard 7 attached. FIG. 4 shows a partially opened view of the glasses 9 providing additional details of certain features of one example of the glasses. In this example, magnetic materials 55 are provided at certain locations to either bias the glasses closed or open. By magnetic materials 55, it is meant to include permanent magnets and/or ferromagnetic materials that are attracted to such magnets. In alternative examples, each of the magnetic materials 55 are comprised of a permanent magnet, such as a permanent magnet made of an AlNiCo, ceramic, rare earth or FeCrCo material. Alternatively, one of the magnetic materials is selected to be a permanent magnet and a magnetic material opposite of the permanent magnet is selected as a ferromagnetic material that is not a permanent magnet, such as a ferromagnetic steel or nickel. These materials may be visible on the surface of the glasses or may be embedded within a thin layer of a polymer or other material that does not prevent magnetic attraction between the two magnetic materials 55 that either hold the glasses in a closed configuration or an open configuration or both.

Figure 7:
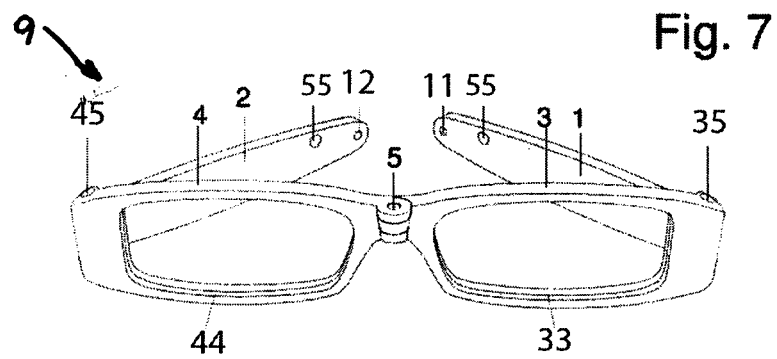
FIG. 7 illustrates another detailed perspective view.
Figure 10:
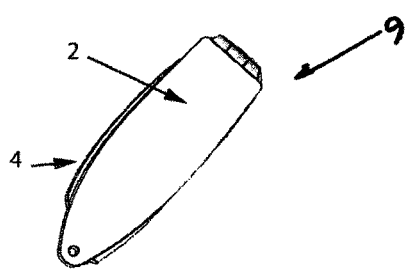

In FIG. 4, holes 11, 12 are shown as attachment points in the temple pieces 1,2, for example. Other types of attachment points may be provided for attaching the lanyard 7 to the temple pieces 1,2. It should be noted that the temple pieces 1,2 are shorter than the ear pieces of typical glasses and extend only a short distance over the temples of the wearer. As seen in FIG. 10, the temple pieces may entirely cover and protect the lenses 33,44 from damage, such as by inadvertent scratching of the lenses, while the glasses are not being used for reading. Each temple piece 1,2 may comprise a hinge portion 22,21 hingedly attached to a respective frame 3,4, for example. For example, FIG. 5 show hinge pins 35,45 joining hinge portions 31,41 of the frames 3,4 to the respective hinge portion 22,21 of the temple pieces 1,2. Also, a hinge 5 is shown hingedly joining each of the two frames 3,4. FIG. 6 shows the glasses 9 fully open from a back view, illustrating the hinges, and FIG. 7 illustrates a front view.

Figure 8:
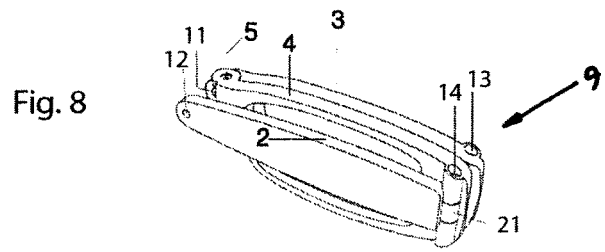
FIGS. 8-10 illustrate alternative examples scaling the width of the temple pieces to the width of the frame.
Figure 9:
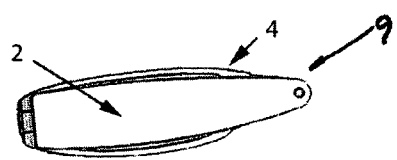

FIGS. 8-10 show alternative variations of the temple piece 2 on the frame 4 that partially protects the lens 44 (FIG. 8), completely protects the lens 44 (FIG. 9) and completely covers the frame 4 and lens 44 (FIG. 10). In FIG. 10, the glasses 9, when folded, may appear as a decorative pendant, for example.

Figure 11A:
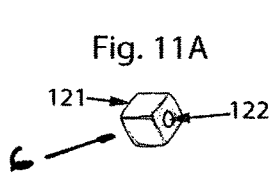
FIGS. 11A-G are examples of adjustable weights and/or retainers.
Figure 11B:
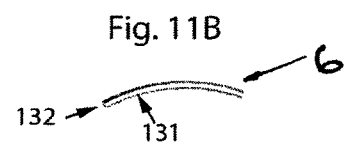
Figure 11E:
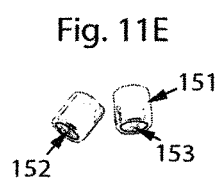
Figure 11C:
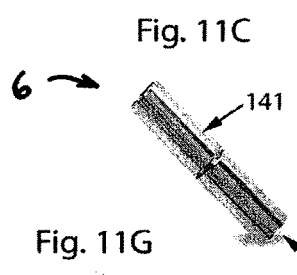
Figure 11D:
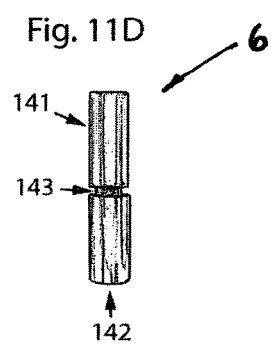
Figure 11F:
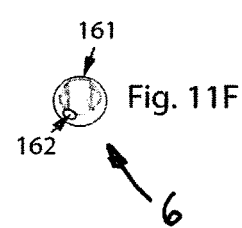
Figure 11G:
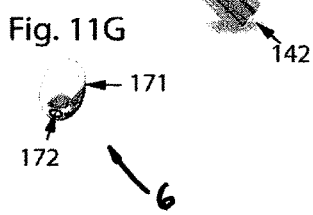

In FIGS. 11A-11G, the drawings show various weights 6 that may be adjustably disposed on the lanyard 7, such that the weights 6 do not move on the lanyard 7 until adjusted by the wearer, for example. In each of these examples, a channel 122,132,142,152,162,172 extends through the respective weight 121,131,141,151,161,171, such that a lanyard 7 may be threaded through the weight. The lanyard 7 may be any cord-like material, such as a cord, wire, chain or cable. In one example, as shown in FIG. 11E, a friction material 153, such as a silicone, is disposed on the inner surface of the hole 152 that passes through the weight 151. The friction material 153 may be used for gripping by friction onto a surface of a lanyard made of a chain, such as a metal chain, for example. In one example, the chain is made of a stainless steel, and the weight 151 is combined with one or more other weights. For example, by disposing the gripping weight 151 on both sides of a larger, decorative weight 141, both the gripping weights 151 and decorative weight 141 may be adjustable along the length of a lanyard 7.

Figure 12:
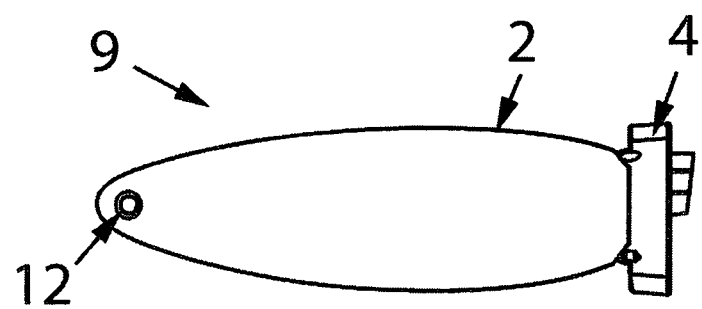
FIGS. 12-13 are examples of a foldable glasses with frame and lens protective temple pieces.
Figure 13:
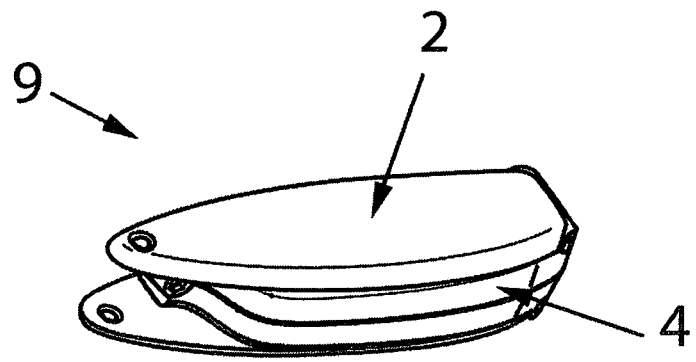

FIGS. 12-13 show an examples of foldable glasses 9 comprising a wide temple piece 2 capable of covering and protecting the entire frame 4 and any lens mounted in the frame. FIG. 12 is a right side view of the open configuration showing an attachment point 12 in one end of the temple piece 2, and FIG. 13 shows the closed configuration.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. Foldable reading glasses having an open position and a closed position for use by a wearer comprise:
   a lanyard;
   a plurality of weights adjustably mounted on the lanyard, whereby the wearer adjusts the position of the plurality of weights on the lanyard;
   a first frame having a front surface and a rear surface;
   a second frame, having a front surface and a rear surface, the second frame being hingedly coupled to the first frame, such that the first frame and the second frame are hingedly engaged such that the front surface of the first frame may be disposed in opposition to the front surface of the second frame, when the first frame and the second frame are hingedly disposed in the closed configuration;
   a first temple piece is that does not extend to the wearer's first ear hingedly coupled to the first frame at one end of the first temple piece and is coupled to the lanyard at an opposite end of the first temple piece, opposite of the one end of the first temple piece, such that the first temple piece at least partially covers the first frame, when disposed in the closed configuration;
   a second temple piece that does not extend to the wearer's second ear is hingedly coupled to the second frame at one end of the second temple piece and is coupled to the lanyard at an opposite end of the second temple piece, opposite of the one end of the second temple piece, such that the second temple piece at least partially covers the second frame, when disposed in the closed configuration;
   wherein the plurality of weights have a collective mass selected to counterbalance the weight of the foldable reading glasses, when the foldable reading glasses are disposed in the open configuration on a bridge of a nose of the wearer, and the lanyard is disposed over each of the wearer's ears and behind the wearer's neck.

2. The glasses of claim 1, further comprising a first magnetic material and a second magnetic material, wherein the first magnetic material is disposed in a portion of the first frame and the second magnetic material is disposed in a portion of the first temple piece, such that the first magnetic material is magnetically attracted and opposed to the second magnetic material, when the first frame and the first temple piece are disposed in the closed configuration.

3. The glasses of claim 2, further comprising a third magnetic material and a fourth magnetic material, wherein the third magnetic material is disposed in a portion of the second frame and the fourth magnetic material is disposed in a portion of the second temple piece, such that the third magnetic material is magnetically attracted and opposed to the fourth magnetic material, when the second frame and the second temple piece are disposed in the closed configuration.

4. The glasses of claim 3, further comprising a fifth magnetic material and a sixth magnetic material, wherein the fifth magnetic material is disposed in a portion of the first frame, and the sixth magnetic material is disposed in a portion of the second frame, such that the fifth magnetic material is magnetically attracted and opposed to the sixth magnetic material, when the first frame and the second frame are disposed in the closed configuration.

5. The glasses of claim 1, wherein each of the plurality of weights comprises a channel, each of the channels passes through a respective one of the plurality of weights, and the lanyard is threaded through the channels of each of the plurality of weights.

6. The glasses of claim 5, wherein at least one of the plurality of weights comprises an inner surface of the channel, and the inner surface is comprised of a friction material.

7. The glasses of claim 6, wherein the friction material is a silicone.

8. The glasses of claim 7, wherein the silicone is adhered to the surface of the channel.

9. The glasses of claim 8, wherein the lanyard is a chain.

10. The glasses of claim 9, wherein the chain is comprised of a metal.

11. The glasses of claim 10, wherein the metal is comprised of a stainless steel.

12. The glasses of claim 11, wherein the weight is comprised of a stainless steel.

13. The glasses of claim 9, wherein the chain is a box chain, a wheat chain or a snake chain.

14. The glasses of claim 13, wherein the chain is a box chain.

15. The glasses of claim 1, wherein the plurality of weights comprises at least two main weights and further comprising at least four stoppers, wherein one of the at least four stoppers is disposed on each side of the two main weights, and each of the at least four stoppers comprise a friction material on an inner surface, where the inner surface is in contact with the lanyard.

* * * * *